United States Patent [19]

Mahon et al.

[11] Patent Number: 5,071,161
[45] Date of Patent: Dec. 10, 1991

[54] AIR BAG RESTRAINT SYSTEM WITH VENTING MEANS

[75] Inventors: Geoffrey L. Mahon, Ridgewood; Allen Breed, Boonton Township, Morris County, both of N.J.

[73] Assignee: 501 Breed Automotive Technology, Inc., Boonton Township, Morris County, N.J.

[21] Appl. No.: 418,131

[22] Filed: Oct. 6, 1989

[51] Int. Cl.⁵ .............................................. B60R 21/30
[52] U.S. Cl. .................................... 280/739; 280/731; 280/743
[58] Field of Search ............... 280/740, 742, 736, 737, 280/743, 729, 728, 741, 739

[56] References Cited

U.S. PATENT DOCUMENTS

| | | | |
|---|---|---|---|
| 3,618,981 | 11/1971 | Leising et al. | 280/740 |
| 3,708,181 | 1/1973 | Mazelsky | 280/740 |
| 3,814,458 | 6/1974 | Acs | 280/729 |
| 3,843,151 | 10/1974 | Lewis | 280/736 |
| 3,887,213 | 6/1975 | Goetz | 280/739 |
| 3,972,545 | 8/1976 | Kirchoff et al. | 280/736 |
| 4,017,100 | 4/1977 | Gehrig et al. | 280/736 |
| 4,111,458 | 9/1978 | Okada et al. | 280/739 |
| 4,178,017 | 12/1979 | Ishi et al. | 280/740 |
| 4,394,033 | 7/1983 | Goetz | 280/740 |
| 4,830,401 | 5/1989 | Honda | 280/736 |
| 4,907,819 | 3/1990 | Cuevas | 280/736 |

FOREIGN PATENT DOCUMENTS

| | | |
|---|---|---|
| 1381825 | 1/1975 | United Kingdom . |
| 1415330 | 11/1975 | United Kingdom . |
| 2199261 | 7/1988 | United Kingdom . |

Primary Examiner—Kenneth R. Rice
Attorney, Agent, or Firm—Kane Dalsimer Sullivan Kurucz Levy Eisele and Richard

[57] ABSTRACT

An air bag assembly is disclosed with an inflator assembly for generating gases with particulate byproducts, and a bag assembly with a gas permeable portion. The gas permeable portion vents gases from the bag at a preselected rate to eliminate injuries from secondary collisions of a passenger with the bag. The permeable portion also filters the gases to protect the passenger from the particulate by products.

13 Claims, 1 Drawing Sheet

AIR BAG RESTRAINT SYSTEM WITH VENTING MEANS

BACKGROUND OF THE INVENTION a. Field of Invention

This invention pertains to an air bag restraint system for vehicles, and more particularly to a system with venting means to allow the air bag to collapse in a controlled manner.

Automobile collisions involve vehicle impacts that result in abrupt changes in the vehicle's velocity. Occupants riding within a vehicle must also sustain these velocity changes if they are to remain within the occupant compartment. However, the manner and timing in which they will experience them is dependent upon the way in which the occupant is restrained within the vehicle.

Technically, unless ejected, the occupant is always "restrained" in some way or another. For frontal impacts, restraint will be either by a seat belt, air bag, or violent contact with the steering wheel, windshield or instrument panel. In other words, sooner or later, the occupant's velocity must be equalized to that of the vehicle, resulting in a change in absolute velocity relative to the ground.

In terms of energy, the occupant's velocity change equates to change in the magnitude of his kinetic energy. The relationship between velocity and kinetic energy is strictly defined and given by well-known mathematical formulas. The purpose of any occupant restraint system then is to help achieve this change in energy with a minimum of traumatic force.

In terms of physics, the energy change is achieved by applying a restraining force over a given distance. In simple terms, the less distance over which the force is applied, the higher the applied force will have to be in order to achieve the given energy change. The minimization of restraint force is therefore achieved by maximization of the "over ground" distance over which the force is applied.

In a barrier collision, for example, the theoretical maximum over ground distance available to the occupant includes the following: the distance that the occupant compartment travels as the front end of the vehicle structure is deforming plus the distance within the compartment that the occupant can traverse before unwanted contact with a "hard" structural surface (i.e. steering wheel, windshield, instrument panel, etc.).

Because the over ground distance includes the crush of the vehicle's structure, it is important to begin restraining the occupant as soon into the crash event as possible. In this way, the occupant will be using the deformation of the vehicle to help dissipate his energy.

In an ideal situation, a constant restraint load is applied at the instant the impact begins and is such that the occupant utilizes all the available distance within the occupant compartment. Such a force would be the minimum required to dissipate the occupant's energy.

In the worst case, no restraint force is applied until the vehicle is fully deformed and come to rest, and the occupant has completely traversed the compartment. At this point the occupant will then impact the steering wheel, windshield and/or instrument panel. Depending upon the compliance of these components (which, in general are not very compliant and also tend to exert localized loading), the occupant will sustain his energy change by way of a very high force exerted over the relatively short distance these components will yield.

What can realistically be achieved lies somewhere in between these two extremes. Seat belts, one would think, directly and immediately apply the restraint load to the occupant. In reality, the compliance of the belt and occupant, slack and spoolout from the retractor, and the belt geometry relative to the occupant serve to delay the onset of significant restraint force until well into the vehicle impact event.

Air bag systems also involve a delay in the application of restraint load. The sensing of the crash severity and decision to deploy in conjunction with the time required to deploy and fill the bag constitute the delay associated with inflatable restraint systems.

As stated previously, the purpose of a restraint system is to minimize the traumatic force applied to achieve the occupant's required change in velocity. Strict minimization of the force magnitude is not sufficient in itself. The application of the force should be done in such a way as to minimize the trauma it incurs.

In this respect, air bags excel over all other currently available restraint systems. In comparison to seat belts, which essentially exert a line force across the pelvis and diagonally across the torso, an air bag distributes the restraint load over the entire upper torso and face. The air bag's ability to spread the restraint force over a large area of the occupant's body significantly reduces the potential for trauma.

However, once the air bag is deployed, it becomes relatively rigid so that a secondary collision between the air bag and the occupant may occur which has a much lower impact then without the air bag, but may still be strong enough to cause injuries. In fact under certain conditions, the occupant may rebound hard enough to lose contact with the bag.

b. Description of the Prior Art

As a solution to this problem, air bags have been suggested which have one or more relatively large vent holes for venting the gas from the air bag at a predetermined rate. This solution is feasible if a clean gas (i.e. a gas without particulate matter) is used for pressurizing the bag. It has been found that the pressurized gas is preferably produced by reactions of chemicals because prior to the reactions, the solid and/or liquid reactants can be stored in a very small space. This consideration is especially important for air bags which are mounted in a steering column. However, gas produced by such chemical means includes a large concentration of particulate matter and therefore it is unacceptable in air bags with venting holes described above because the vented gas escapes into the passenger compartment together with the particulate matter with detrimental effects on the occupants.

OBJECTIVES AND SUMMARY OF THE INVENTION

In view of the abovementioned disadvantages of the existing air bag restraint systems, it is an objective of the present invention to provide an air bag restraint system which reduces the forces on the occupants of a vehicle over a preselected time period.

A further objective is to provide an air bag system with venting in which the pressurizing gas is produced by chemical reactions.

Other objectives and advantages of the invention shall become apparent from the following description of the invention.

At any point in time, the force exerted by the air bag is directly related to its internal pressure. This pressure results from gas supplied by a generator, located within the air bag module, which produces nitrogen and/or other relatively inert gases by burning a solid propellant. During the deployment, as the gas first enters the tightly folded bag, the pressure quickly rises until the bag finally bursts through the cover. Directly thereafter, the pressure drops to zero as the loose bag fills. Once the fill is completed and the fabric becomes taut, the bag the pressurizes and is capable of restraining the occupant.

In order to apply restraining force as soon as possible, the inflator must quickly bring the bag pressure up to a significant level. As the occupant penetrates the bag thereby reducing the volume, the pressure rises further. In order to prevent the pressure, and thus the restraining force, from becoming too high, some of the gas is allowed to escape as the occupant in the present invention penetrates the bag. This is what is know as bag "venting".

Without venting, the bag will essentially act like a spring, with the restraining force increasing proportionally with occupant penetration. For high penetrations, the force on the occupant will become unacceptably high along with the occupant rebound velocity away from the bag. By allowing some of the gas to escape during penetration, the pressure is held more constant, and the air bag becomes a much more efficient energy absorbing device. The rebound velocity, and its associated potential injuries are also significantly reduced.

The degree to which the bag is vented becomes a design parameter that considerably influences the system performance. Too much venting can result in the occupant over-penetrating the bag and impacting the steering wheel. Too little venting will cause excessive bag force and rebound velocities. Thus, the vent must be tuned to work with the bag, inflator, and other system components in order to obtain optimum performance.

An air bag restraint system constructed in accordance with this invention comprises a sensor or sensors for sensing a crash, an air bag arranged and disposed in a vehicle compartment for minimizing the effects of the crash on an occupant, and pressurizing means for releasing gas under pressure in said bag for inflation. The bag is made at least partially of a material which is gas permeable for allowing the gas to escape from the bag at a metered rated and at the same time to intercept and filter particulate matter generated during the production of the gas. Additionally, the gas generator may also be provided with a filtering means to localize the particulate matter around the gas generator.

DETAILED DESCRIPTION OF THE INVENTION

Figure 1:
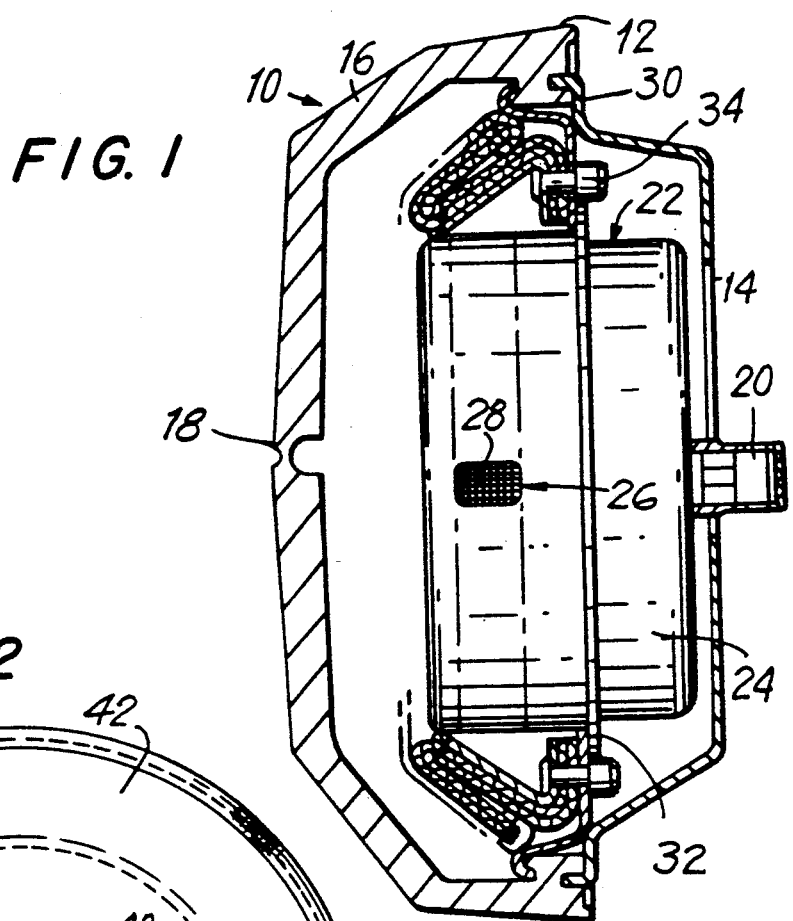
FIG. 1 discloses a partial cross-sectional view of an air bag module constructed in accordance with this invention.

As previously mentioned, the air bag restraint system described herein is particularly useful when space is at a premium, such as for example for a module installed in a motor vehicle steering column. Such a module 10 is shown in FIG. 1 and it includes an enclosure 12 defined by a back plate 14 and a hub cove 16. The hub cover is made of a frangible material or is provided with weakened sections as at 18. The housing is mounted on the steering column 20.

Inside the housing 12 there is an inflator assembly 22 for generating a gas by chemical action. The assembly comprises a metal ca 24 with exit holes 26. Holes 26 are preferably provided with a mesh 28. Surrounding at least a portion of the housing, there is a folded air bag assembly 30. The assembly is secured to a support plate 32 by bolts 34 so that an air tight seal is formed by the bag around the holes 26.

Figure 2:
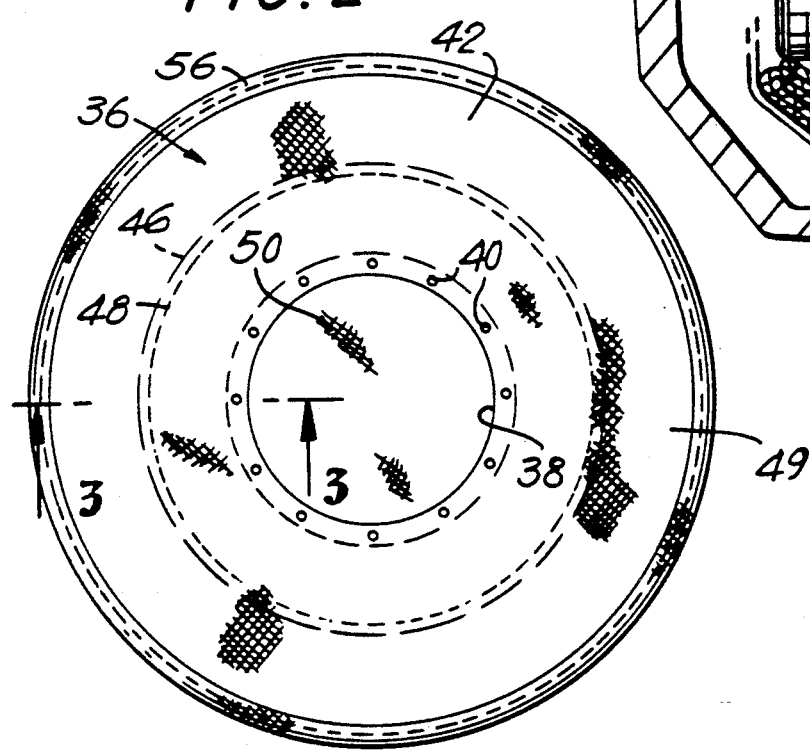
FIG. 2 shows a plan view of an air bag used in the module of FIG. 1.
Figure 3:
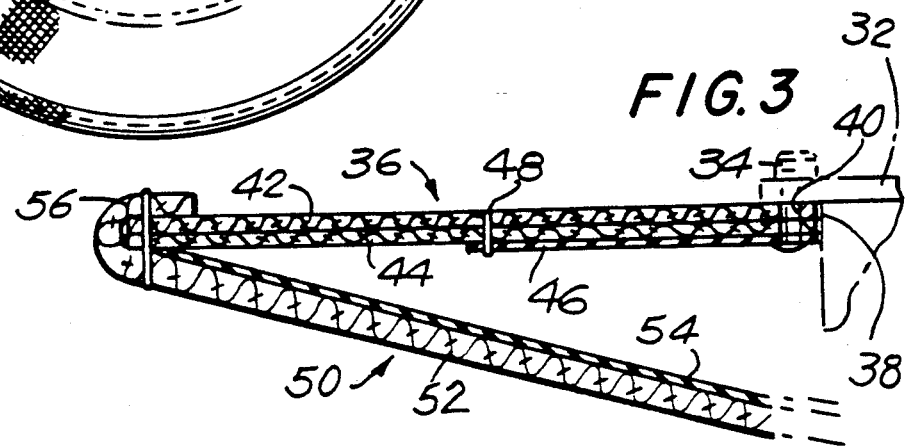
FIG. 3 is a partial cross-sectional view of the air-bag of FIG. 2.

FIGS. 2 and 3 show bag assembly in an unfolded configuration. The bag consists of two fabric sections. The top section 36 has a central circular hole 38 sized to fit around the inflation assembly 22. This central hole 38 is surrounded with a plurality of smaller holes 40 used for housing bolts 34 which hold the bag in place. Section 36 consists of a layer of fabric 42, and an inner or layer 44. In addition, there is a layer of protective material 46 extending radially outwardly from hole 38 to approximately half-way across layer 44 as shown in FIG. 3. Thus fabric section 36 consists of two annular fabric zones; an inner fabric zone which is impermeable because of layer 46, and an outer fabric zone which is permeable to gases but impermeable to particulate matter. Layer 42 is preferably made of a fabric which is permeable to air, such as for example, a fabric made by W. L. Gore and Associates, Inc under the name of GORE-TEX ® Nanofabril Membrane. This fabric is impermeable to water, but is permeable to gases and therefore is a good filtering material. It has been found that this fabric can filter out 99.9994% of the particulate matter having a diameter of 0.1 micrometers. The inner component 44, is a support member strong enough to maintain the bag intact as it is pressurized. This second component may be made for example of nylon, NOMEX ® or other similar fabric. Preferably component 44 is provided with a fireproof coating to protect the bag from combustion and heat during the inflation of the bag.

Layer 46 may be made, for example, of NEOPRENE ® or other similar material. Layer 46 protects the bag from flame and heat. In addition, component 46 is impermeable to air flow. The outer perimeter of component 44 is secured to layer 42 by a circular seam or sawing 48. Importantly, an annular portion 49 of the top section 36 consists only of layers 42 and 44 to permit gases to escape from the bag at a controlled rate as described more fully below. The type of fabric selected for this layer, the total area of this layer which is not coated by Layer 46, and the pressure gradient or difference between across the fabrics determines the rate of release of the gases.

The bottom section 50 consists of a layer 52 which may be made of the same fabric as component 44 mentioned above. The fabric 52 is also coated with a rubberized material such as component 46, as at 54 to increase the strength of the fabric, protect it from heat and render it impermeable to air flow. Bottom section 50 is overlaps and is sewn to the top section 36 as shown at 56.

The air bag restraining device operates as follows. When an accelerometer (not shown) senses a crash it activates the inflator assembly 22. In the inflator assembly, gases are produced and expanded very rapidly, by combustion, or other chemical action. These gases exit through holes 26 and pressurize the bag assembly. As the bag assembly expands, it breaks out of the housing 10, by opening or breaking hub cover 16. Some of the particulate materials which are the by-products of the combustion or other chemical action within the inflator assembly, are contained within can 24 by screen 28. Other particulate matter escapes into the bag assembly. As the bag is inflated toward its maximum dimensions, the occupant disposed between the bag and the motor vehicle seat is projected by the primary or secondary collision into the bag. The additional pressure within caused by the passenger's collision with the bag force gases to escape through the portion 49 of the upper section 36 bag.

Obviously numerous modifications may be made to the invention without departing from its scope as defined in the appended claims.

We claim:

1. A passenger restraint system for motor vehicles comprising:
   inflator means for generating gases by a process resulting in particulate matter dispersed in said gases; and
   a bag assembly coupled to said inflator means for inflation by said gases, said bag assembly including a first fabric zone impermeable to said gases and a second fabric zone coupled to and in contact with the first fabric zone, said second fabric zone being permeable to said gases but impermeable to said particulate matter, said second fabric zone being shaped and sized to vent said gases at a predetermined rate, wherein said first and second fabric zones remain in contact with each other when the bag assembly is expanded.

2. The passenger restraint system of claim 1 further comprising screen means for filtering particulate matter from gases passing from said inflator assembly to said bag assembly.

3. The passenger restraint system of claim 1 wherein said second section comprises two coextensive fabric layers, one of said layer being provided for filtering, and the second layer being provided for reinforcing said first layer.

4. An air bag assembly for use in a passenger restraint system in a motor vehicle comprising:
   a. a first fabric zone impermeable to gases; and
   b. a second fabric zone made of a fabric and permeable to gases, cooperating with said first zone and in contact therewith to form an inflatable enclosure, whereby said second zone filters and vents gases from said enclosure and said first and second zones remain in contact with each other when the enclosure is inflated.

5. The bag assembly of claim 4 further comprising securing means for securing said inflatable enclosure to a gas generator for inflation.

6. The air bag assembly of claim 5 wherein said first fabric zone includes an opening for connecting said air bag assembly to an inflator assembly of a passenger restraint system in a motor vehicle.

7. The air bag assembly of claim 6 wherein said first fabric zone includes an annular protective coating disposed around said opening for protecting said air bag from heat.

8. The air bag assembly of claim 4 comprising a continuous fabric section including a first layer made of a material permeable to gases but impermeable to particulate matter, said layer being partially covered by a gas-impermeable coating to form said second fabric zone, with the remaining fabric section forming said first fabric zone.

9. The air bag of claim 8 wherein said continuous fabric section further includes a second layer permeable to gases and particulate matter superimposed on said first layer for reinforcement.

10. A passenger restraint system for reducing injury of a passenger due to a crash in a motor vehicle, said motor vehicle including a passenger compartment, comprising:
    a. a housing disposed in said compartment:
    b. inflator means for generating gases by a process resulting in particulate matter dispersed in said gases; and
    c. a bag assembly coupled to said inflator means for inflation by said gases, said bag assembly including a first fabric zone impermeable to said gases and a second fabric zone positioned adjacent to and in contact with the first zone and being permeable to said gases and impermeable to said particulate matter, said second fabric zone being shaped and sized to vent said gases at a predetermined rate while remaining positioned adjacent to and in contact with first fabric zone when the bag assembly is in the expanded state.

11. The bag assembly of claim 10 wherein said first fabric zone includes an opening for fitting said bag assembly around said inflator assembly.

12. The bag assembly of claim 11 wherein said first fabric zone includes an annular region comprising a protective material disposed around said opening for protecting the bag assembly from heat generated by said inflator assembly.

13. The passenger restraint system of claim 10 wherein said second zone comprises two coextensive fabric layers, one of said layer being provided for filtering, and the second layer being provided for reinforcing said first layer.

* * * * *